_United States Patent Office_ 3,120,251
Patented Feb. 4, 1964

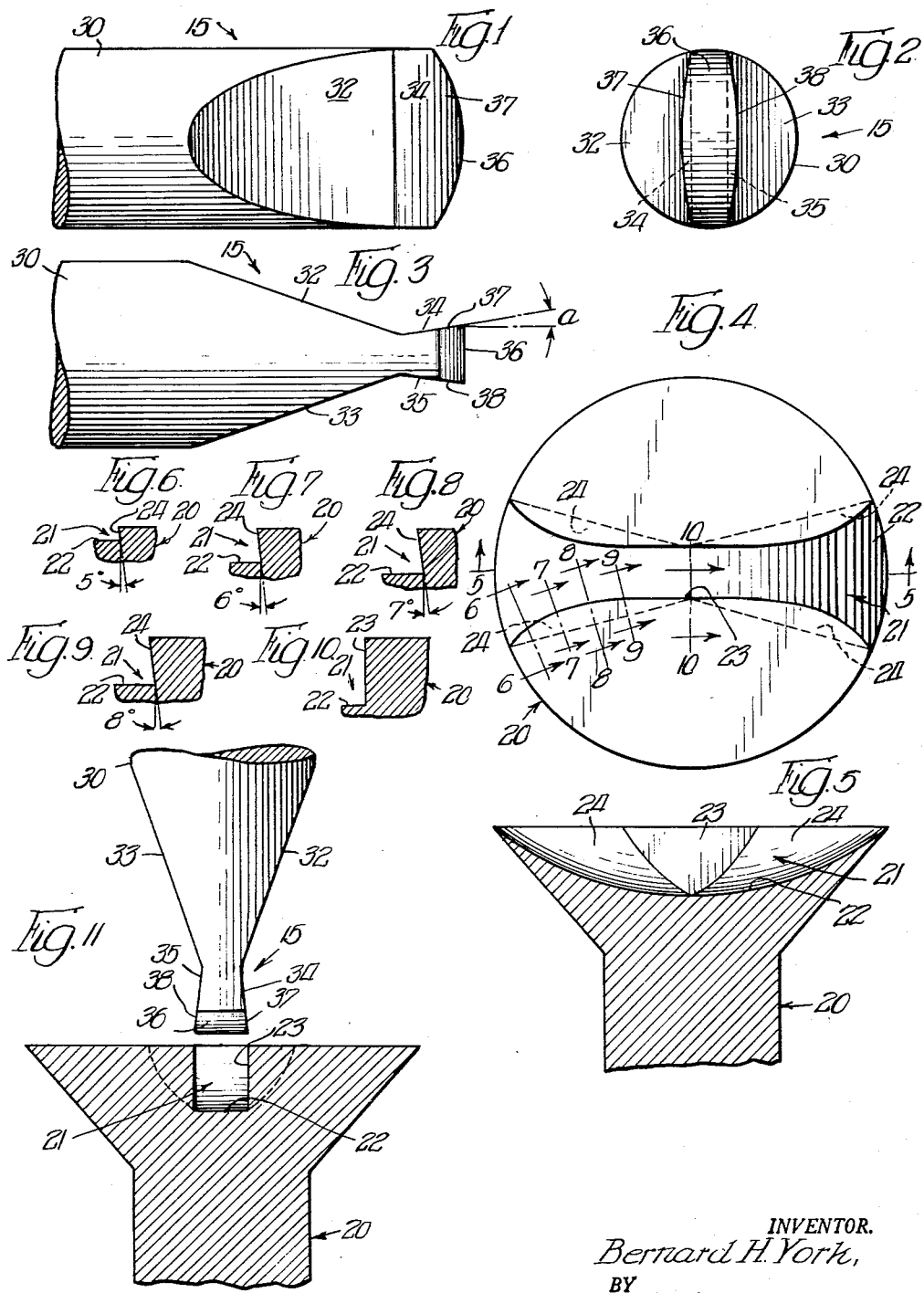
Feb. 4, 1964 — B. H. YORK — 3,120,251
SCREWDRIVER
Filed Nov. 12, 1959
INVENTOR.
Bernard H. York,
BY
Cromwell, Greist & Warden
attys.

3,120,251
SCREWDRIVER
Bernard H. York, Granada Hills, Calif., assignor to Voi-Shan Industries, Inc., Los Angeles, Calif., a corporation of Illinois
Filed Nov. 12, 1959, Ser. No. 852,497
1 Claim. (Cl. 145—50)

The present invention relates to an improvement in screwdrivers which are intended for use with screws or other fasteners having undercut driver-receiving recesses in the heads. More particularly, the invention relates to a planar-face driver for use with fasteners having driver-receiving recesses of the type wherein the bottom surface of the recess is arcuate and wherein portions of the bearing walls of the recess diverge outwardly from the center thereof and define conical surfaces of revolution.

Driver-receiving recesses of the type described are disclosed in Vaughn Patent No. 2,677,985 and Wing et al. Patent No. 2,792,039. The Wing et al. patent and a related Vaughn Patent No. 2,808,087 set forth that the bearing surfaces of the drivers to be used with the described recesses should be complementary and define conical surfaces of revolution. However, it has been found that the use of drivers having bearing surfaces which substantially complement the bearing surfaces of the fastener recesses results in an initial torque being applied at the outer ends of the fastener recesses which tends to result in deformation and shearing of the fastener material at the ends of the recesses.

It is therefore an important object of the present invention to provide a new and improved planar-face driver for use with fasteners having driver-receiving recesses of the type wherein portions of the bearing walls of the recesses diverge outwardly from the center thereof and are non-planar whereby the bearing contact between the planar faces of the driver and the non-planar portions of the fastener recesses is initiated at the center of the recess with the area thereof increasing progressively outwardly as the driver torque is increased.

Another important object of the invention is to provide a new and improved driver for fasteners having undercut driver-receiving recesses wherein the driver is provided with a driving tip having an arcuate leading end and a pair of opposite planar-bearing surfaces which diverge away from each other in a direction toward said leading end whereby the leading edges of the driver tip are non-parallel and whereby the arcuate leading end has a greater thickness at its midpoint than at the ends thereof.

Another object of the invention is to provide a new and improved driver having an arcuate leading end and a pair of planar bearing faces diverging toward said leading end which driver is adapted for use in undercut driver-receiving recesses having either arcuate or flat bottom surfaces.

A still further important object of the invention is to provide a new and improved planar-face driver of the character described which permits the application of a relatively high driver torque to undercut recesses of the type wherein portions of the bearing walls of the recesses diverge outwardly from the center thereof and define conical surfaces of revolution before noticeable recess deformation and failure occur.

Further objects of the invention are to provide a new and improved planar-face driver of the character described for use in undercut recesses having non-planar bearing surfaces wherein the driver is readily insertable in the recesses due to the variance in the thickness of the leading edge thereof, wherein torque can be applied to the recesses from greater driver inclination angles while still exploiting the undercut restraint of the recesses to maximum efficiency, and wherein original fabrication and redressing of the diverging planar faces of the driver into an integral shaft may be easily and economically accomplished either with grinding or milling equipment normally available in most any machine shop or by a forging type operation using dies.

Certain other objects of the invention will, in part, be obvious, and will in part appear hereinafter.

For a more complete understanding of the nature and scope of the invention reference may now be had to the accompanying drawings wherein:

FIG. 1 is an elevational view on enlarged scale of the driving tip of a driver embodying the invention;

FIG. 2 is a right end view of the driving tip as shown in FIG. 1;

FIG. 3 is a plan view of the driving tip as shown in FIG. 1;

FIG. 4 is a top plan view on enlarged scale of a commercially available fastener having an undercut driver-receiving recess of the type for which the driver shown in FIGS. 1, 2 and 3 is particularly well adapted;

FIG. 5 is a fragmentary vertical section taken generally on the line 5—5 of FIG. 4;

FIGS. 6, 7, 8, 9 and 10 are enlarged fragmentary vertical sections taken respectively on lines 6—6, 7—7, 8—8, 9—9, and 10—10 of FIG. 4 illustrating the variation in the angle between the arcuate bottom of the driver-receiving recess of FIGS. 4 and 5 and the bearing walls thereof at various positions relative to the center of the fastener recess; and FIG. 11 is a composite view illustrating the driving tip shown in FIGS. 1, 2 and 3 positioned for insertion into the driver-receiving recess of the fastener illustrated in FIGS. 4 and 5 with the fastener being shown in vertical section.

In FIGS. 1, 2 and 3, a driving tip 15 for a driver is illustrated which has been developed for high-torque operation with fasteners having undercut driver-receiving recesses and particularly for fasteners having undercut driver-receiving recesses of the type illustrated in FIGS. 4–11. The illustrated driver-receiving recess, which is of the type disclosed in Vaughn Patent No. 2,677,985 is formed by means of a rotary cutter having outwardly diverging cutting edges, which cutter, after the recess has been cut to the desired depth, is bodily pivoted, first in one direction and then the other, about the longitudinal axis of the fastener a specified number of degrees whereby to provide the undercut portion of the recess. Driver-receiving recesses formed in this manner are characterized by bearing walls having vertically disposed planar portions at the center of the recess and non-planar portions which diverge outwardly from the planar surfaces and define conical surfaces of revolution.

Referring specifically to FIGS. 4–11, there is shown a flat-head screw 20 having an undercut recess 21 of the type described herein formed in the head thereof. The recess 21 is characterized by an arcuate bottom 22, and by bearing side walls each of which includes a central, generally triangularly shaped, vertically disposed planar portion 23 and outwardly diverging portions 24 defining segments of conical surfaces of revolution. As illustrated in FIGS. 6–10, which are vertical sections through the recess 21 at various distances from the center thereof, the angle in the recess 21 between the arcuate bottom 22 and the non-planar portions 24 of the bearing side walls decreases in a direction away from the center of the recess 21. For example, assuming that the recess 21 had been formed by a rotary cutter wherein each cutting edge diverged from the vertical at an angle of 10°, the angle in the recess 21 between the arcuate bottom 22 and the non-planar portions 24 of the bearing side walls would decrease from 8° to 5°.

The previously mentioned Wing et al. Patent No. 2,792,-

039 discloses in FIGS. 9 and 10 a driver for fasteners having driver-receiving recesses of the type disclosed in the patent. The diverging bearing surfaces of the disclosed driver are described as being fragments of frustoconical surfaces. Vaughn Patent No. 2,808,087, which issued from a divisional application of the previously mentioned Vaughn Patent No. 2,677,985, discloses a driver wherein it is set forth that the diverging bearing surfaces of the driver should correspond or be complementary to the conical surfaces of revolution of the bearing walls of the recess disclosed in the Vaughn Patent No. 2,677,- 985. Thus, the known prior art pertaining to a driver for fasteners having undercut recesses of the type disclosed in FIGS. 4–11 of the present application is limited to drivers wherein the diverging bearing surfaces thereof are non-planar.

It was discovered and then verified by extensive testing, that the use of drivers having non-planar bearing surfaces with fasteners having undercut driver-receiving recesses of the type shown in the drawings wherein portions of the bearing walls diverge outwardly from the center of the recess and define conical surfaces of revolution is unsatisfactory inasmuch as in most instances the initial bearing contact between the driver and the bearing walls of the undercut recess, upon the application of driver torque, occurs at the outer ends of the recess where the fastener material is thinnest and thus more easily deformed or sheared off.

With the new planar-faced driver illustrated in FIGS. 1, 2 and 3 this problem has been eliminated inasmuch as the novel geometry of the driving tip 15 is such that the initial bearing contact between the bearing surfaces of the driving tip 15 and the fastener recess 21 is at the center of the recess 21 with the area of bearing contact therebetween increasing progressively toward the outer ends of the recess 21 as the driver torque is increased. Thus, a substantially greater torque may be safely applied to the recess 21 by the driver disclosed herein than with the drivers disclosed in either the Wing et al. Patent No. 2,792,039 or the Vaughn Patent No. 2,808,087 without mutilation of the fastener material at the outer ends of the recess 21. This advantageous feature of the driver disclosed herein is due to the new geometry of the driving tip 15 thereof. Any material deformation resulting from use of the driver disclosed herein would occur near the center of the recess 21 and at the bottom thereof whereby the upper surface and outer edge of the head of the fastener 20 will remain smooth. Such material deformation is far less objectionable than that which occurs at the outer ends of a fastener recess.

The new and improved geometry of the driving tip 15 of the driver disclosed herein is best illustrated with reference to FIGS. 1, 2 and 3. The illustrated planar-face driving tip 15 is formed on a solid round shaft 30 and is defined by a pair of planar surfaces 32 and 33 formed on opposite sides of the shaft 30, which surfaces converge in a direction toward the end of the driving tip 15 and intersect a pair of planar bearing surfaces 34 and 35. The planar surfaces 34 and 35 diverge in a direction toward the end of the driving tip 15 and intersect an arcuate surface 36 formed on the leading end of the driving tip 15. The axis of the radii of the arcuate end surface 36 lies in a plane which passes through the axis of the shaft 30 at right angles to the planar surfaces 32, 33, 34 and 35.

The intersection of the diverging planar-bearing surfaces 34 and 35 with the arcuate end surface 36 on the driving tip 15 provides a pair of leading edges 37 and 38 which are non-parallel to each other. As best illustrated in FIG. 2, the arcuate end surface 36 of the driving tip 15 has a greater thickness at its midpoint than at the ends thereof and in endwise profile appears to be generally elliptical or oval in configuration. The described configuration of the leading end of the driving tip 15 facilitates insertion thereof into undercut driver-receiving recesses from either end of such recesses.

The arcuate leading end of the driving tip 15 permits the application of torque to undercut driver-receiving recesses with the driver axis inclined relative to the fastener axis (i.e. not co-axial) while still exploiting the undercut restraint of the recesses to maximum efficiency. Although the disclosed driving tip 15 is particularly well adapted for use with undercut recesses of the type having arcuate bottoms, as best illustrated in FIG. 5, it is also adapted for use in undercut recesses having flat or horizontally extending planar bottoms. When the driving tip 15 is used with fasteners having undercut recesses with arcuate bottoms, it is preferable that the arc of the recess bottom be substantially the same as the arc formed on the leading end of the driving tip 15.

The angle of planar-face separation "a" (FIG. 3) of the planar bearing surfaces 34 and 35 of the driving tip is limited by the geometry of the particular undercut recess in the fastener to be driven. As previously discussed herein, the angle between the arcuate bottom 22 of the recess 21 and the non-planar portions 24 of the bearing walls thereof decreases from the center of the recess toward the ends thereof. The angle of planar-face separation "a" of the driving tip 15 must therefore not be less than the angle in the recess 21 in a plane parallel to the fastener axis and located near the outer end of the recess 21 nor greater than the largest angle existing in the recess 21 in a plane passing through the axis of the radii of the arcuate bottom 22. With reference to the particular driver-receiving recess 21 illustrated in the fastener of FIGS. 4–10, the angle of planar-face separation "a" of the driving tip 15 must not be less than 5° nor greater than 8°. If the fastener is of the type having an undercut driver-receiving recess with a flat or planar bottom, the angle of planar-face separation "a" of the driver should not be less than the smallest angle in any plane parallel to the fastener axis and normal to the longitudinal axis of the recess near the centermost portions of the recess.

The thickness of the arcuate leading end 36 of the driving tip 15 at the center or maximum thickness portion thereof should be substantially equal to the width of the driver-receiving recess 21 at its center although in some cases it may be preferable to have the thickness of the arcuate leading end 36 slightly greater whereby to provide a slight interference fit between the driving tip 15 and the driver-receiving recess 21.

As a result of the new geometry of the driving tip 15 disclosed herein, specifically the planar-face diverging bearing surfaces 34 and 35 and the non-parallel leading edges 37 and 38, the bearing contact between the bearing faces 34 and 35 of the driving tip 15 and the outwardly diverging non-planar portions 24 of the bearing walls of the recess 21 is initiated at the central portion of the recess 21 with the area of contact therebetween increasing progressively toward the periphery of the fastener head or the outer end of the recess 21 as the driver torque is increased. Thus there is no bearing contact between the driving tip 15 and the outer ends of the bearing walls of the recess 21 until after a considerable amount of driver torque has been applied. Thus, the tendency toward material deformation and subsequent shearing of the material at the outer ends of the recess 21 is substantially reduced.

Another advantageous feature of the driving tip 15 disclosed herein lies in the ease and economy of both the original fabrication and the redressing of the new geometry on an integral shaft or driving member. This can be readily accomplished by grinding or milling operations on equipment normally available in a machine shop. The drivers disclosed in the Wing et al. Patent No. 2,792,039 and the Vaughan Patent No. 2,808,087, which have bearing surfaces defining fragments of conical surfaces of revolution, must be fabricated by machining operations which are substantially more complex. Redressing of such drivers by machining operations is considerably more difficult than redressing the planar-face driver disclosed herein. Although both types of drivers may be fabricated by forging-type operations utilizing suitable dies, the cost of dies for the planar-face driver is considerably less than that for the drivers wherein the bearing surfaces define fragments of conical surfaces of revolution.

It will be understood that certain changes may be made in the construction or arrangement of the planar-face driving tip disclosed herein without departing from the spirit and scope of the invention as defined in the appended claims.

I claim:

In combination a screw head and a driver for the screw head; said screw head having a longitudinal axis and comprising a slot extending along a transverse axis perpendicular to the longitudinal axis across the top of the head, said slot having opposite walls and an arcuate bottom between and intersecting said walls, the arcuate bottom having a center of curvature above the head at said longitudinal axis, a pair of undercut driver-engaging surfaces one of which is in one wall on one side of the longitudinal axis and the other of which is in the other wall on the diametrically opposite side of the longitudinal axis, the upper edge of each driver-engaging surface lying at the surface of the head and the lower edge of each driver engaging surface lying at and intersecting the arcuate bottom and each upper edge overlying its respective lower edge, whereby the width of the slot measured perpendicular to the transverse axis at the driver-engaging surfaces is greater at the bottom than at the top of the slot, said driver engaging surfaces each having substantially the shape of a portion of a cone, said cones each having a central axis above the head which passes through and is substantially perpendicular to the longitudinal axis, the upper edges of the engaging surfaces diverging from the transverse axis in the direction of the periphery of the screw head; said driver having a symmetrical driving tip formed on one end of the shaft comprising, an arcuate leading end, and a pair of opposite single planar bearing walls which diverge from a plane normal to the axis of said shaft and spaced from said leading end in a direction toward said leading end whereby said leading end has a greater thickness at its midpoint than at the ends thereof, the configuration of said driving tip being such that the bearing contact between the planar bearing walls of the driver and the outwardly diverging conical surfaces of revolution of the bearing walls of the recess is initiated at the center of the recess with the area of bearing contact increasing progressively from the center of the recess outwardly as the driver torque is increased whereby to substantially reduce the tendency toward deformation and shearing of the fastener material at the outer ends of the recess.

References Cited in the file of this patent
UNITED STATES PATENTS

| | | |
|---|---|---|
| 370,255 | Hart | Sept. 20, 1887 |
| 1,997,422 | Lorenzen et al. | Apr. 9, 1935 |
| 2,631,624 | Wright | Mar. 17, 1953 |
| 2,792,039 | Wing et al. | May 14, 1957 |
| 2,808,087 | Vaughn | Oct. 1, 1957 |